United States Patent
Tamai

(10) Patent No.: US 7,448,541 B2
(45) Date of Patent: Nov. 11, 2008

(54) PRODUCT INFORMATION ACQUISITION APPARATUS

(75) Inventor: Ayami Tamai, 6-18-14, Kofudai, Toyono-cho, Toyono-gun, Osaka (JP) 563-0104

(73) Assignees: Shigematsu Co., Ltd., Osaka (JP); Mori Industrial Engineering Laboratory, Osaka (JP); Ayami Tamai, Osaka (JP)

( * ) Notice: Subject to any disclaimer, the term of this patent is extended or adjusted under 35 U.S.C. 154(b) by 1280 days.

(21) Appl. No.: 10/663,790

(22) Filed: Sep. 17, 2003

(65) Prior Publication Data

US 2004/0133442 A1 Jul. 8, 2004

(30) Foreign Application Priority Data

Jan. 7, 2003 (JP) .............................. 2003-001197

(51) Int. Cl.
G06K 15/00 (2006.01)

(52) U.S. Cl. ...................... 235/383; 235/382; 235/385

(58) Field of Classification Search ................. 235/382, 235/383, 385, 462.01, 462.15, 462.25, 487, 235/472.01
See application file for complete search history.

(56) References Cited

U.S. PATENT DOCUMENTS

| | | |
|---|---|---|
| 5,955,719 A | 9/1999 | Southworth et al. |
| 6,213,398 B1 | 4/2001 | Southworth et al. |
| 6,446,871 B1 | 9/2002 | Buckley et al. |
| 6,769,604 B2 * | 8/2004 | Ichikawa et al. ............ 235/375 |

FOREIGN PATENT DOCUMENTS

| | | |
|---|---|---|
| JP | 11144012 | 5/1999 |
| JP | 2000-165536 | 6/2000 |
| JP | 2001-142770 | 5/2001 |
| JP | 2002-15704 | 1/2002 |
| JP | 2002-518750 | 6/2002 |
| JP | 2002-197207 | 7/2002 |
| JP | 2002-197341 | 7/2002 |
| JP | 2002-261680 | 9/2002 |
| JP | 2002-278454 | 9/2002 |
| JP | 2002-283627 | 10/2003 |

OTHER PUBLICATIONS

Patent Abstracts of JP-11-144012.
Patent Abstracts of JP-2002-15704.
English Language Abstract of JP 2002-283627.
English Language Abstract of JP 2001-142770.
English Language Abstract of JP 2000-165536.
English Language Abstract of JP 2002-261680.
English Language Abstract of JP 2002-197341.
English Language Abstract of JP 2002-197207.
English Language Abstract of JP 2002-278454.

* cited by examiner

*Primary Examiner*—Seung H Lee
(74) *Attorney, Agent, or Firm*—Greenblum & Bernstein, P.L.C.

(57) ABSTRACT

Comprising: an IC tag 110 attached to a product 100, which memorizes data that indicates a storage location of information related to a product and a code that identifies the product; and a product information acquisition apparatus 120, which reads out data indicating the storage location of the information related to the product from the IC tag 110, acquires the information related to the product from servers 140, 150 and 160 based on the read out data showing the storage location of the information related to product, and displays content of the information related to the product.

12 Claims, 11 Drawing Sheets

Fig. 3A

| Information ID (Type of product information) | Address (URL) | Security |
|---|---|---|
| 6 (Production) | http://www.saba.jp/123456789/production/ | Yes |
| 8 (Sales) | http://www.saba.jp/123456789/sales/ | No |
| 23 (Service) | http://www.saba.jp/123456789/service/ | Yes |
| 40 (Recycling) | http://www.saba.jp/123456789/recycling/ | Yes |

| Identification code | 123456789 |
|---|---|

114b

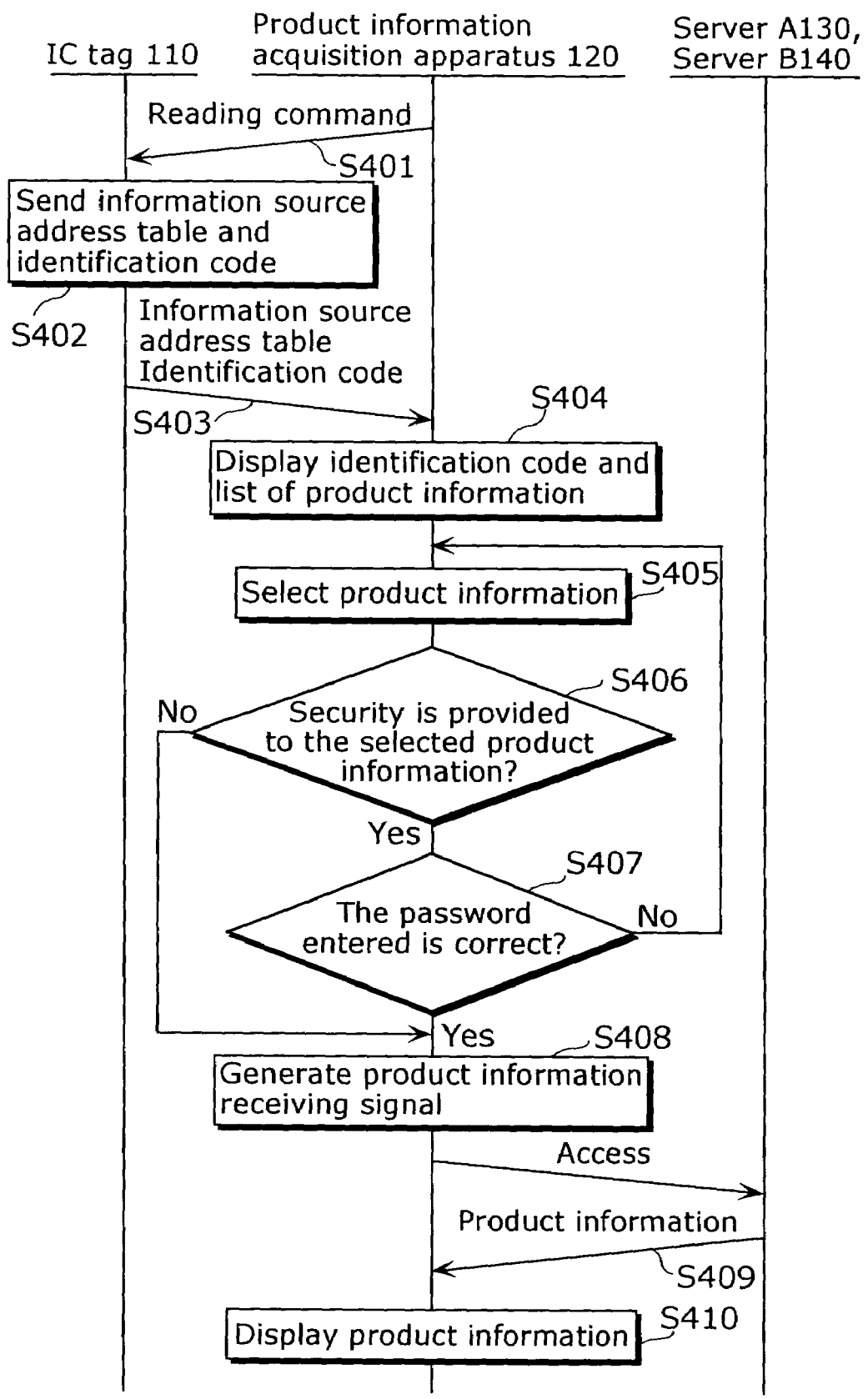

Fig. 8

| Identification code | Information ID (First layer) | Information ID (Second layer) | Address (URL) | Security |
|---|---|---|---|---|
| 987654321 | 6 (Production) | 6A (Basic information) | http://www.saba.jp/987654321/production/basicinformation/ | Yes |
| | | 6B (Material) | http://www.saba.jp/987654321/production/material/ | No |
| | | 6C (How to produce) | http://www.saba.jp/987654321/production/howtoproduce/ | No |
| | | 6D (Quality) | http://www.saba.jp/987654321/production/quality/ | No |
| | | 6E (Repair) | http://www.saba.jp/987654321/production/repair/ | Yes |
| | 8 (Sales) | 8A (Basic information) | http://www.saba.jp/987654321/sales/basicinformation/ | No |
| | | 8B (Warranty) | http://www.saba.jp/987654321/sales/warranty/ | No |
| | 23 (Service) | 23A (Basic Information) | http://www.saba.jp/987654321/service/basicinformation/ | Yes |
| | | 23B (Repair) | http://www.saba.jp/987654321/service/repair/ | Yes |
| | | 23C (Maintenance next time) | http://www.saba.jp/987654321/service/maintenancenexttime/ | Yes |
| | 40 (Recycling) | 40A (Basic information) | http://www.saba.jp/987654321/recykle/basicinformation/ | Yes |
| | | 40B (Description) | http://www.saba.jp/987654321/recykle/description/ | Yes |

211a

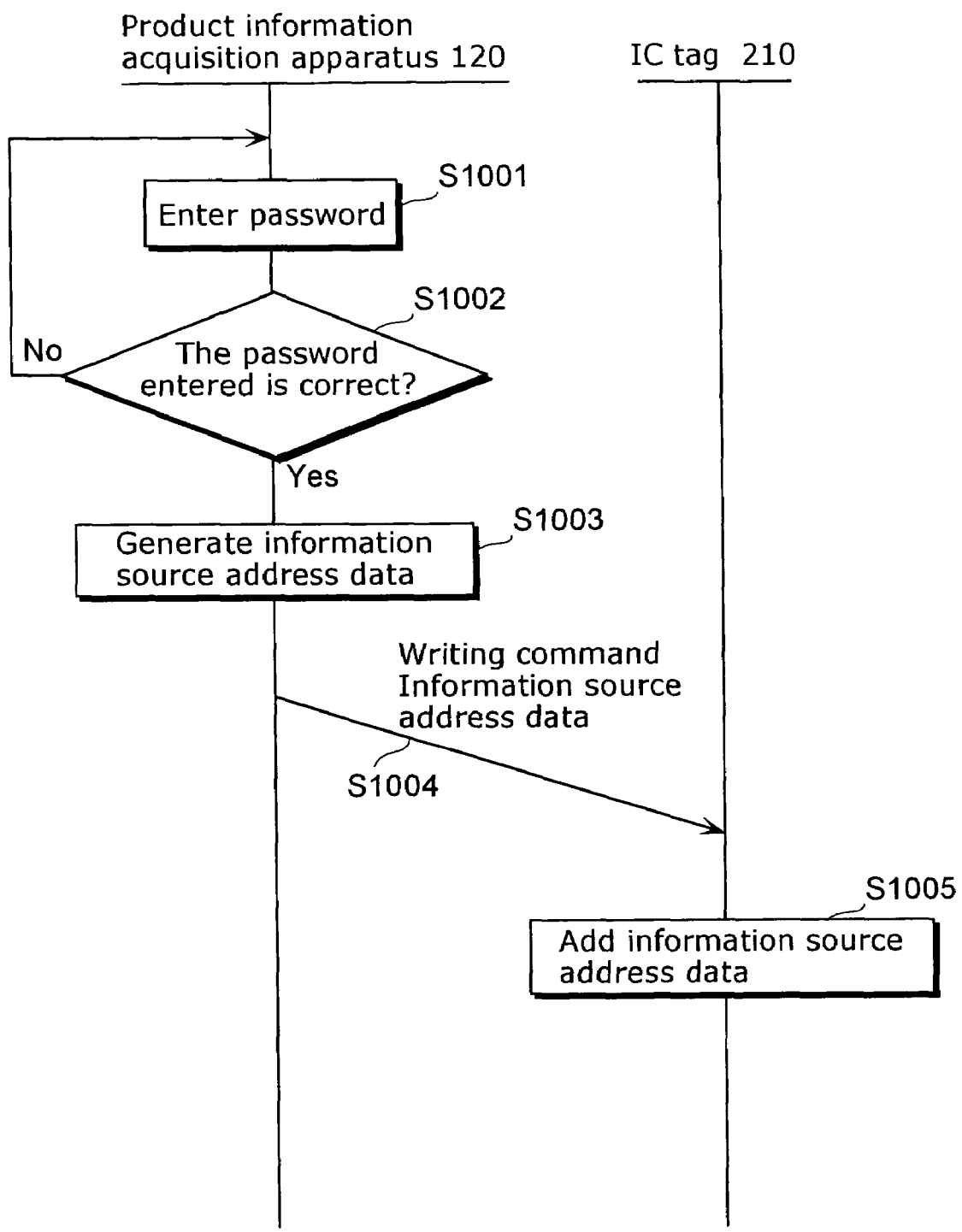

PRODUCT INFORMATION ACQUISITION APPARATUS

BACKGROUND OF THE INVENTION (1) Field of the Invention

The present invention relates to a label where a product code is recorded, a product with the label attached, a product information acquisition apparatus and a product code editing apparatus based on the label.

(2) Description of the Related Art

In recent years, high attention is paid to an IC tag, a two-dimensional code and the like as a new elemental technology that identifies and manages a product. Compared with a conventional bar code, the IC tag and the two-dimensional code have bigger capacity. Therefore, it is possible to unify management for both product and supplemental information and realize highly accurate information management.

As one of prior arts that use the IC tag for product information management, there is an art called "A noncontact tag, a production distribution management method and a production distribution management system" (See a Japanese Laid-Open Patent No. 11-144012). It relates to a management method for a product in a production distribution process, and the IC tag is used as a media that memorizes information obtained in each stage of the production distribution process. Also, as one of other prior arts that use the IC tag for the information management, there is an art called "A user authentication method and a user authentication system that use the IC tag" (See a Japanese Laid-Open Patent No. 2002-157040). It relates to a user authentication method executed when a computer terminal is used, and the IC tag is used as a media that memorizes data that identifies a user who uses the terminal.

However, since the conventional information management that uses the conventional IC tag or the two-dimensional code depends on a property of the IC tag or of the two-dimensional code, which has relatively big data capacity, and the IC tag or the two-dimensional code does not memorize information efficiently under this management. Therefore, only product information limited for a specific purpose is stored, or only a limited range of product information is stored therein. It is difficult to view an extremely large amount of information such as a detailed product description containing pictures or images.

Additionally, because the conventional information management using the conventional IC tag or the two-dimensional code merely memorizes all necessary information as it is, and does not count any efforts of the user who views the information memorized in the IC tag or the two-dimensional code. Furthermore, it does not allow the user to view the latest product information that is updated from time to time.

SUMMARY OF THE INVENTION

In view of aforementioned problems, the present invention aims at providing a label that can memorizes information efficiently in a product distribution process as a primary objective, and providing a product information acquisition apparatus that does not require the user to do any complex operations when he/she views the information as a secondary objective.

In order to achieve above objectives, a label to which a product code is recorded, wherein the product code includes: an item identification code that identifies a relevant product; and a plurality of information source addresses that specify a storage location where information related to the said product is memorized.

In this way, it is not necessary for the label to memorize the information related to the product as it is. Therefore, there is an effect for the label to memorize the information efficiently and the user can access the most up-to-date page.

Also, the label the label comprises a noncontact IC tag, and the product code is memorized in the noncontact IC tag.

In this way, the label is meant to have a large amount of data capacity so that the label can memorize much information.

Here, the present invention is a product information acquisition apparatus that acquires information related to a product with a label attached, wherein an item identification code, which identifies the said product, and a product code, which includes a plurality of information source addresses that specify a storage location where the information related to the said product is memorized, are recorded on the label, and the product information acquisition apparatus comprises: a first reading out unit operable to read out the item identification code and the information source address that are recorded on the label; a first information acquisition unit operable to acquire information of the product corresponding to the item identification code from a location indicated by the readout information source address via a communication path; and a first display unit operable to display the acquired information.

In this way, when the user view content of the information related to the product with the label attached, he/she does not need to search for the information related to the product. Therefore, there is an effect that the product information acquisition apparatus can provide the information related to the product to the user without requiring him/her to do any complicated operation.

Also, the present invention may be a product code editing apparatus that edits a product code memorized in a label, wherein the label is equipped with a noncontact IC tag to which the product code is recorded, the product code includes: an item identification code that identifies a relevant product; and a plurality of information source addresses that specify a storage location where information related to the said product is memorized, the product code editing apparatus comprises a first writing unit operable to write a new product code on the noncontact IC tag.

And, the present invention may also be a product code editing apparatus that edits a product code memorized in a label, the label is a code that includes a two dimensional code to which a product code is recorded, the product code includes: an item identification code that identifies a relevant product; and a plurality of information source addresses that specify a storage location where information related to the said product is memorized, the product code editing apparatus comprises a first writing unit operable to write a new product code on the two dimensional code.

In this way, because it enables the noncontact IC tag to memorize new information related to the product, there is an effect that any product-related information obtained at each stage of the production distribution can be registered.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 3A is a table chart that shows content of an information source address table 114a in the above system.

FIG. 3B is a table chart that shows content of an identification code 114b in the above system.

FIG. 5 is a sequence diagram that shows actions taken for reading information in the above system.

FIG. 8 is a table chart that shows content of an information source address table 211a in the above system.

FIG. 11 is a sequence diagram that shows actions taken for writing information in the above system.

DESCRIPTION OF THE PREFERRED EMBODIMENT(S)

First Embodiment

The following describes a product information providing system according to the first embodiment of the present invention with reference to diagrams.

Figure 1:
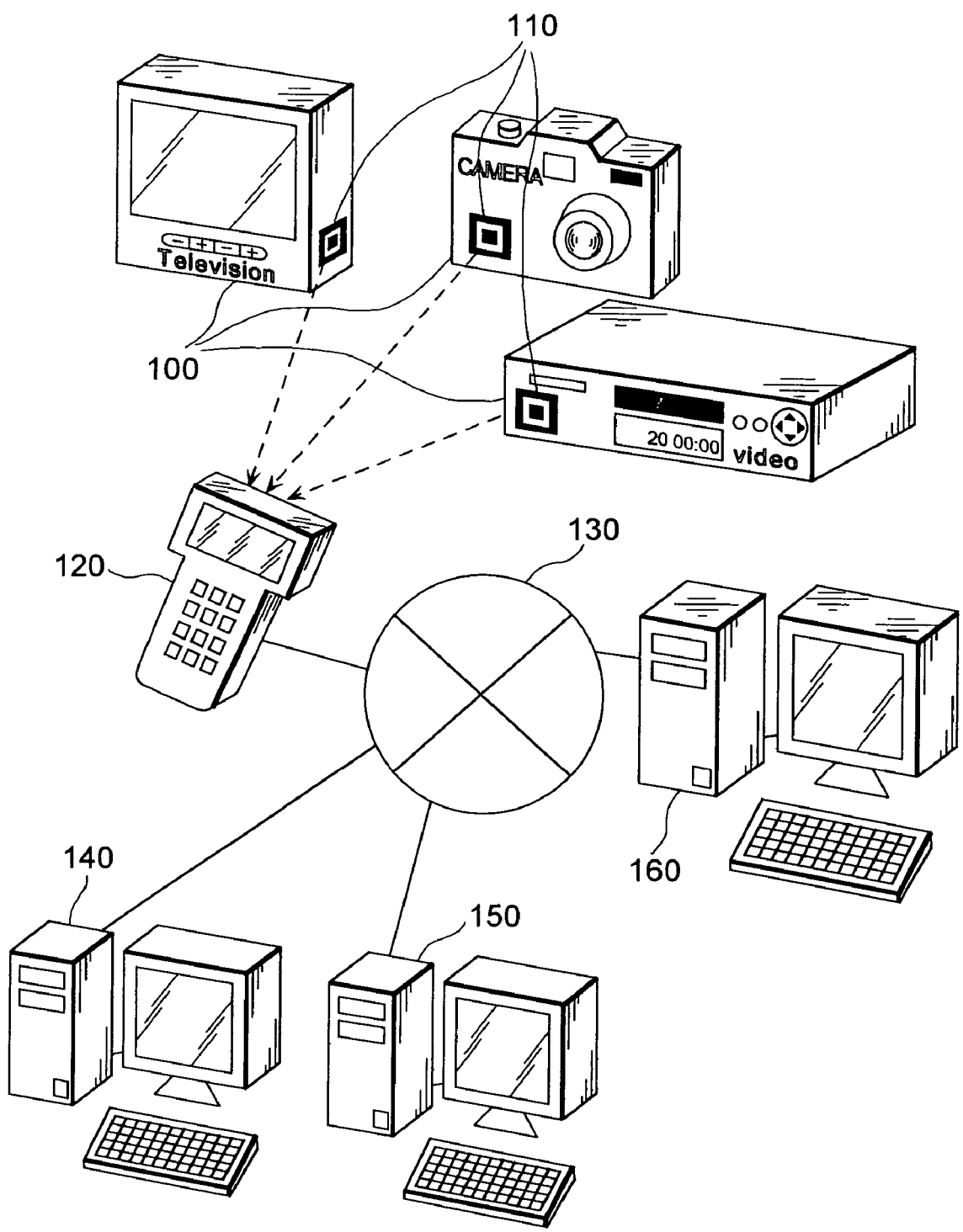
FIG. 1 is a system configuration diagram that shows a usage status of an information providing system according to a first embodiment of the present invention.

FIG. 1 is a system configuration diagram that shows a usage status of a product information providing system according to the first embodiment of the present invention.

The product information providing system according to the present embodiment aims at providing information related to a product 100 to a user. The product information providing system comprises an IC tag 110 attached to the product 100, a product information acquisition apparatus 120 connected to a network 130 such as the Internet, and servers 140, 150 and 160.

Figure 2:
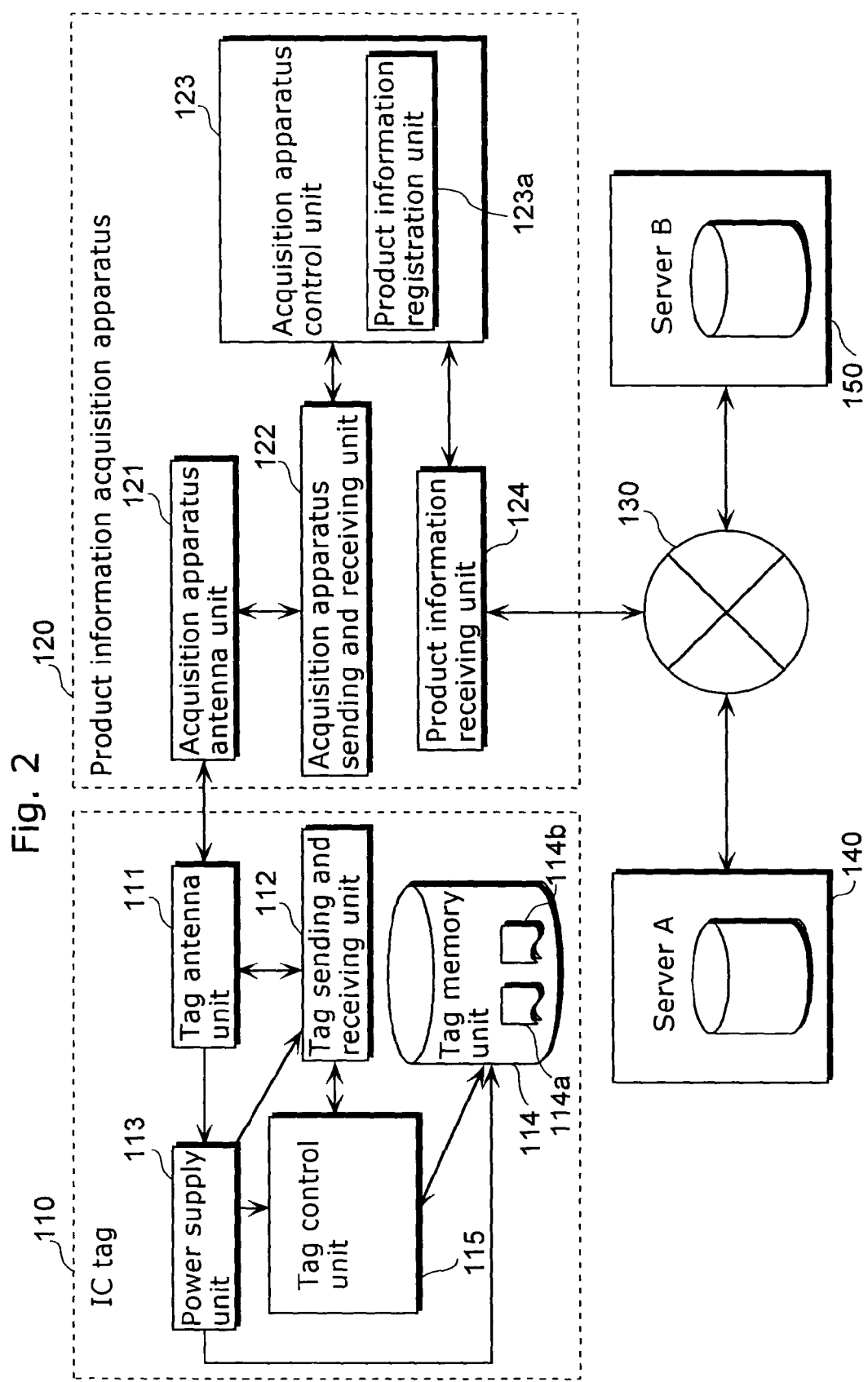
FIG. 2 is a block diagram that shows a configuration of the above system.

FIG. 2 is a block diagram that shows an internal configuration of the product information providing system according to the present embodiment of the present invention.

The IC tag 110 is detachable from the product 100 and has a sheet type shape of 30 mm×30 mm with approximately 1 mm in thickness, which memorizes an information source address table 114a and an identification code 114b, sends the memorized information source address table 114a and identification code 114b to the product information acquisition apparatus 120. The IC tag 110 is functionally composed of a tag antenna unit 111, a tag sending and receiving unit 112, a power supply unit 113, a tag memory unit 114 and the tag control unit 115.

FIG. 3A is a diagram that shows content of the information source address table 114a.

As shown in FIG. 3A, the information source address table 114a is composed of a plurality of information source address data. And in each of the information source address data, the following items are registered: a type of product information related to the product 100 with the IC tag 110 attached; an address (Uniform Resource Location of a specific page within a web site) of a storage location for the product information; and whether security is provided for the product information or not. For example, the information source address table 114a is composed of the information source address data related to the product information called "Production", the information source address data related to the product information called "Sales", the information source address data related to the product information called "Service", and the information source address data related to the product information called "Recycling". In the information source address data related to the product information called "Production", an address (URL), "http://www/saba.jp/123456789/production/" indicating the storage location of the production information called "Production" and availability of the security for the product information called "Production" are registered. Also, in the information source address data related to the product information called "Sales", an address (URL), "http://www.saba.jp/123456789/sales/" indicating the storage location of the product information called "Sales" and unavailability of the security for the product information called "Sales" are registered. "Yes" mentioned here in the information source address table 114a shows "security is provided", whereas "No" indicates "security is not provided".

Also, an information ID for identifying the product information is assigned to a type of the product information of the information source address data. For example, the information ID called "6" is assigned to the product information called "Production", the information ID called "8" is assigned to the product information called "Sales", the information ID called "23" is assigned to the product information called "Service", and the information ID called "40" is assigned to the product information called "Recycling".

FIG. 3B is a diagram that shows content of the identification code 114b.

As shown in FIG. 3B, an identification code for identifying the product 100 with the IC tag 110 per single unit is registered in the identification code 114b. For example, the identification code such as "123456789" is registered.

The tag antenna unit 111 is a coil type antenna or the like, which receives a radio wave at a specific frequency including a reading command, generates AC power by an electromagnetic induction method or the like while receiving the radio wave, supplies the AC power to the power supply unit 113, and sends the information source address table 114a and the identification code 114b as a radio wave at a specific frequency to the product information acquisition apparatus 120. The reading command mentioned here is a signal that instructs the IC tag 110 to send the information source address table 114a and the identification code 114b. The tag antenna unit 111 receives a radio wave at a specific frequency that includes the information source address data, the identification code 114b and a writing command, generates AC power by the electromagnetic induction method while receiving the radio wave, and supplies the AC power to the power supply unit 113. The writing command mentioned here is a signal that instructs the IC tag 110 to memorize the information source address data and the identification code 114*b*.

The tag sending and receiving unit 112 is composed of a modulation circuit, a demodulation circuit and the like, which demodulates the radio wave at the specific frequency received by the tag antenna unit 111, reproduces the writing command, the reading command, the information source address data and the identification code 114*b*, and sends the reproduced writing command, reading command, information source address data and identification code 114*b* to the tag control unit 115. Also, the tag sending and receiving unit 112 receives the information source address table 114*a* and the identification code 114*b* from the tag control unit 115, modulates the received information source address table 114*a* and identification code 114*b* to a signal at a specific frequency, and sends it to the tag antenna unit 111.

The power supply unit 113 generates DC power from the supplied AC power, and provides it to the tag control unit 115, the tag sending and receiving unit 112 and the tag memory unit 114.

The tag memory unit 114 is composed of a memory and the like, which memorizes the information source address table 114*a* and the identification code 114*b*.

The tag control unit 115 receives, based on the reading command, the information source address table 114*a* and the identification code 114*b* from the tag memory unit 114. According to the writing command, the tag control unit 115 adds the information source address data received from the tag sending and receiving unit 112 to the information source address table 114*a* memorized in the tag memory unit 114, and replaces the identification code 114*b* memorized in the tag memory unit 114 with the identification code 114*b* received from the tag sending and receiving unit 112.

The product information acquisition apparatus 120 reads out the information source address table 114*a* and the identification code 114*b* from the IC tag 110, receives product information from a server A140 and a server B150 based on the readout information source address table 114*a* and identification code 114*b*, displays content of the received product information, and writes the information source address data and the identification code 114*b* to the IC tag 110. The product information acquisition apparatus 120 is functionally composed of an acquisition apparatus antenna unit 121, an acquisition apparatus sending and receiving unit 122, an acquisition apparatus control unit 123 and a product information receiving unit 124.

The acquisition apparatus antenna unit 121 is a coil type antenna or the like, which sends a radio wave at a specific frequency including a reading command to the IC tag 110, and receives a radio wave at a specific frequency including the information source address table 114*a* and the identification code 114*b* from the IC tag 110. The acquisition apparatus antenna unit 121 sends a radio wave at a specific frequency including the information source address data, the identification code 114*b* and a writing command to the IC tag 110.

The acquisition apparatus sending and receiving unit 122 is composed of a modulation circuit, a demodulation circuit and the like, which receives the writing command, the reading command, the information source address data and the identification code 114*b* from the acquisition apparatus control unit 123, modulates the received writing command, reading command, information source address data and identification code 114*b* into a signal at a specific frequency, and sends it to the acquisition apparatus antenna unit 121. The acquisition apparatus sending and receiving unit 122 demodulates the radio wave at the specific frequency received by the acquisition apparatus antenna unit 121, and reproduces the information source address table 114*a* and the identification code 114*b*.

The acquisition apparatus control unit 123 sends the reading command to the acquisition apparatus sending and receiving unit 122, receives the information source address table 114*a* and the identification code 114*b* from the acquisition apparatus sending and receiving unit 122, displays an identification code of the product 100 with the IC tag 110 attached and a list of the product information of the product 100 with the IC tag 110 attached on a display apparatus (not shown in diagrams) based on the received information source address table 114*a* and identification code 114*b*, selects particular product information from the list of the product information according to selection made by an operation apparatus (not shown in diagrams), decides whether the security is provided or not for the selected product information, displays a password entry screen that requires a password entry, decides whether a password entered by the operation apparatus is correct or not, and sends a product information receiving signal, which instructs to receive the selected product information, to the product information receiving unit 124. Also, the acquisition apparatus control unit 123 receives the product information, which is a response of the product information receiving signal, from the product information receiving unit 124 and displays the content of the product information on the display apparatus. The acquisition apparatus control unit 123 is equipped with a product information registration unit 123*a*, displays the password entry screen on the display apparatus, decides whether a password entered from the operation apparatus is correct or not, generates new information source address data and new identification code 114*b* through the product information registration unit 123*a*, and sends the newly generated information source address data, identification code 114*b* and writing command to the acquisition apparatus sending and receiving unit 122.

Here, the content displayed on the display apparatus is shown in FIG. 4.

Figure 4A:
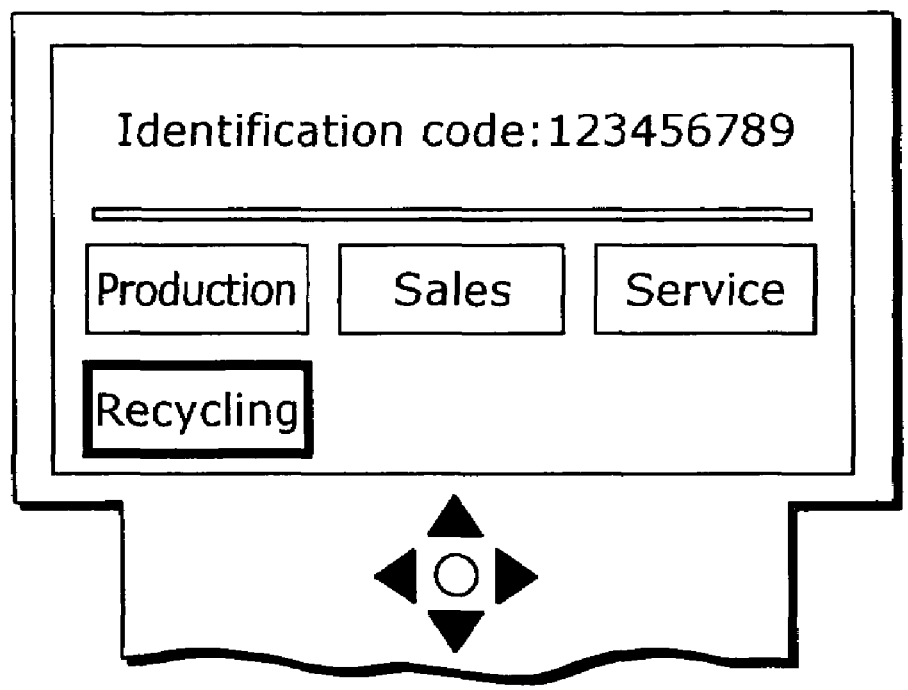
FIG. 4A is a diagram that shows content displayed when an acquisition apparatus control unit 123 receives the information source address table 114a and the identification code 114b from an acquisition apparatus sending and receiving unit 122 in the above system.

FIG. 4A shows the content displayed on the display apparatus for a case the acquisition apparatus control unit 123 receives the information source address table 114*a* and the identification code 114*b* from the acquisition apparatus sending and receiving unit 122. The content displayed is composed of the identification code and a list of the product information. In this case, the display apparatus displays the content describing "the identification code of this product is "123456789", and the product information of "Product", "Sales", "Service" and "Recycling" for this product is registered" (See FIG. 3).

Figure 4B:
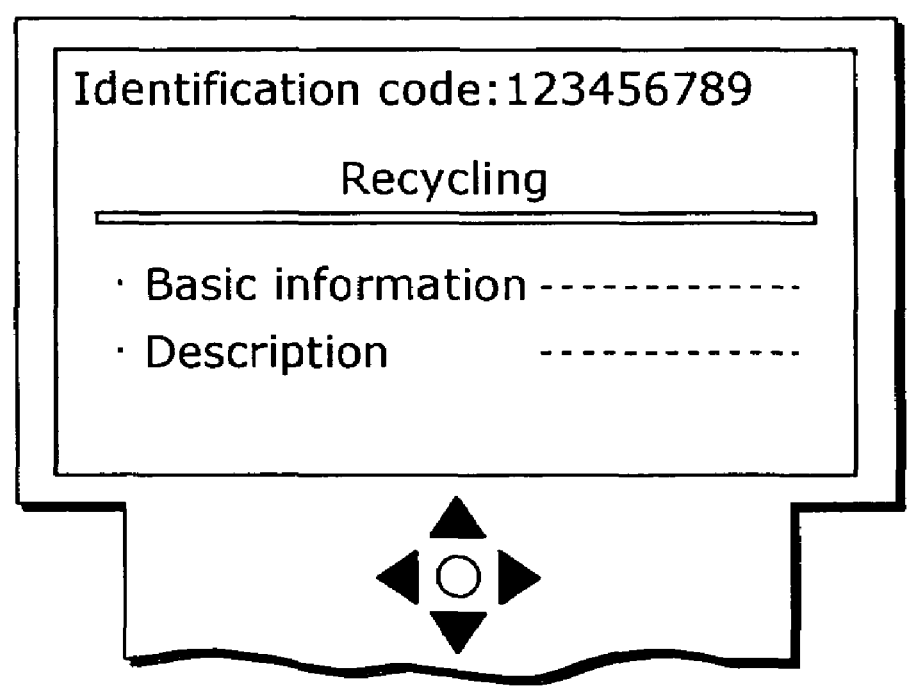
FIG. 4B is a diagram that shows content displayed when particular product information is selected from a list of product information in the above system.

FIG. 4B shows content displayed on the display apparatus for a case the acquisition apparatus control unit 123 selects the product information called "Recycling" from the list of the product information according to selection made by the operation apparatus in FIG. 4A. The content displayed is composed of the identification code, the selected product information and the content of the product information. In this case, the display apparatus displays the content describing "the identification code of this product is "123456789", the product information called "Recycling" is selected by the user for this product, and the content indicated as "Basic information, Description" is contained in the product information called "Recycling"". In FIG. 4, a simple description is given as an example for the content of the production information. However, according the present embodiment, since the product information is memorized in the server, the content of the product information may be an extremely large amount of information such as sounds or images, and the product information acquisition apparatus 120 may display or output such content of the information. For example, when the product information is information of sounds, it is possible to have a function to output the content of the product information, which is received by the acquisition apparatus control unit 123, with sounds from a speaker (not shown in diagrams). By doing so, the content contained in the product information called "Recycling" may be output with sounds such as "This product information called Recycling contains content of the Basic information and Description". And, when the product information is information of images, the content of the product information called "Production" may be output on the display apparatus with images showing how the product is produced (See FIG. 3).

Based on the product information receiving signal received from the acquisition apparatus control unit 123, the product information receiving unit 124 accesses the server A140 or the server B150 and receives the product information from the server A140 or the server B150.

The network 130 is an electric communication network such as a telephone line or an Internet line, which is a route for sending the product information to the product information acquisition apparatus 120.

The server A140 and the server B150 are a computer or the like, which memorizes the product information and sends the memorized product information to the product information acquisition apparatus 120. The server A140 and the server B150 update the memorized product information when necessary.

In the embodiment of the present invention structured as above, the following sequentially describes actions taken by the product information providing system (a flow of data reading processes of the present system) according to a sequence indicated in FIG. 5.

The processes in the diagram are started and ended according to the user's operations. Based upon the operation to start, the product information acquisition apparatus 120 keeps sending a radio wave at a specific frequency including the reading command to the IC tag 110 attached to the product 100 for a specific period of time (Step S401). The specific period of time mentioned here means sufficient time allocated for the product information acquisition apparatus 120 to receive the information source address table 114a and the identification code 114b from the IC tag 110.

The tag antenna unit 111 of the IC tag 110 attached to the product 100 receives a radio wave at a specific frequency including the reading command, generates AC power, and supplies the AC power to the power supply unit 113. The power supply unit 113 generates DC power from the AC power, and supplies it to the tag control unit 115 and the tag sending and receiving unit 112 and the tag memory unit 114. The tag sending and receiving unit 112 demodulates the radio wave at the specific frequency received by the tag antenna unit 111, reproduces the reading command, and sends the reproduced reading command to the tag control unit 115. The tag control unit 115 receives the information source address table 114a and the identification code 114b from the tag memory unit 114 based on the reading command, and sends them to the tag sending and receiving unit 112 (Step S402).

The tag sending and receiving unit 112 modulates the received information source address table 114a and identification code 114b into a signal at a specific frequency and sends it to the tag antenna unit 111. The tag antenna unit 111 sends the information source address table 114a and the identification code 114b to the product information acquisition apparatus 120 as a radio wave at a specific frequency (Step S403).

The acquisition apparatus antenna unit 121 receives the radio wave at the specific frequency including the information source address table 114a and the identification code 114b. The acquisition apparatus sending and receiving unit 122 demodulates the radio wave at the specific frequency received by the acquisition apparatus antenna unit 121, reproduces the information source address table 114a and the identification code 114b, and sends the reproduced information source address table 114a and identification code 114b to the acquisition apparatus control unit 123. The acquisition apparatus control unit 123 displays the identification code of the product 100 with the IC tag 110 attached and the list of the product information of the product 100 with the IC tag 100 attached on the display apparatus based on the information source address table 114a and the identification code 114b (Step S404). For example, when the product information acquisition apparatus 120 sends a radio wave at a specific frequency including the reading command to the IC tag 110 attached to a television, the acquisition apparatus control unit 123 receives the information source address table 114a related to the television with the IC tag 110 attached and the identification code 114b related to the television with the IC tag 110 attached, displays a list of the product information of content called "Production", "Sales", "Service" and "Recycling" on the display apparatus according to the received information source address table 114a, and also displays the identification code of content called "123456789" on the display apparatus according to the received identification code 114b (See FIG. 3).

The acquisition apparatus control unit 123 selects the product information from the list of the product information according to selection made by the operation apparatus of the user of the product information acquisition apparatus 120 (Step S405).

The acquisition apparatus control unit 123 decides whether security is provided to the selected product information or not (Step S406). For example, when content of "Production", "Sales", "Service" and "Recycling" is displayed as the list of the product information on the display apparatus, and the product information called "Production" is selected, the acquisition apparatus control unit 123 decides the security is provided. When the product information called "Service" is selected, the acquisition apparatus control unit 123 decides the security is not provided (See FIG. 3).

When the acquisition apparatus control unit 123 decides the security is provided to the selected product information, it displays the password entry screen on the display apparatus. When the acquisition apparatus control unit 123 decides the password entered by the operation apparatus is correct, it takes actions for receiving the product information. When the acquisition apparatus control unit 123 decides the password entered by the operation apparatus is not correct, it displays the list of the product information once again on the display apparatus (Step S407).

When the security is not provided to the selected product information, or when the password entered by the operation apparatus is decided to be correct, the acquisition apparatus control unit 123 generates a product information receiving signal that instructs to receive the selected product information (Step S408). For example, when content of "Production", "Sales", "Service" and "Recycling" is displayed on the display apparatus as the list of the product information, suppose the product information called "Sales" is selected by the operation apparatus. In such a case, the acquisition apparatus control unit 123 generates a production information receiving signal of content indicating "http://www.saba.jp/123456789/sales/" (See FIG. 3).

The acquisition apparatus control unit 123 sends the generated product information receiving signal to the product information receiving unit 124. The product information receiving unit 124 accesses the server A140 or the server B150 based on the product information receiving signal, and receives product information from the accessed server A140 or server B150 (Step S409). For example, when the product information receiving unit 124 receives the product information receiving signal of the content showing "http://www.saba.jp/123456789/sales/", the product information receiving unit 124 receives product information that is available at the address (URL) indicating http://www.saba.jp/123456789/sales/ on a network from a server that memorizes the product information.

The product information receiving unit 124 sends the received product information to the acquisition apparatus control unit 123. The acquisition apparatus control unit 123 displays the content of the received product information on the display apparatus (Step S410).

Figure 6:
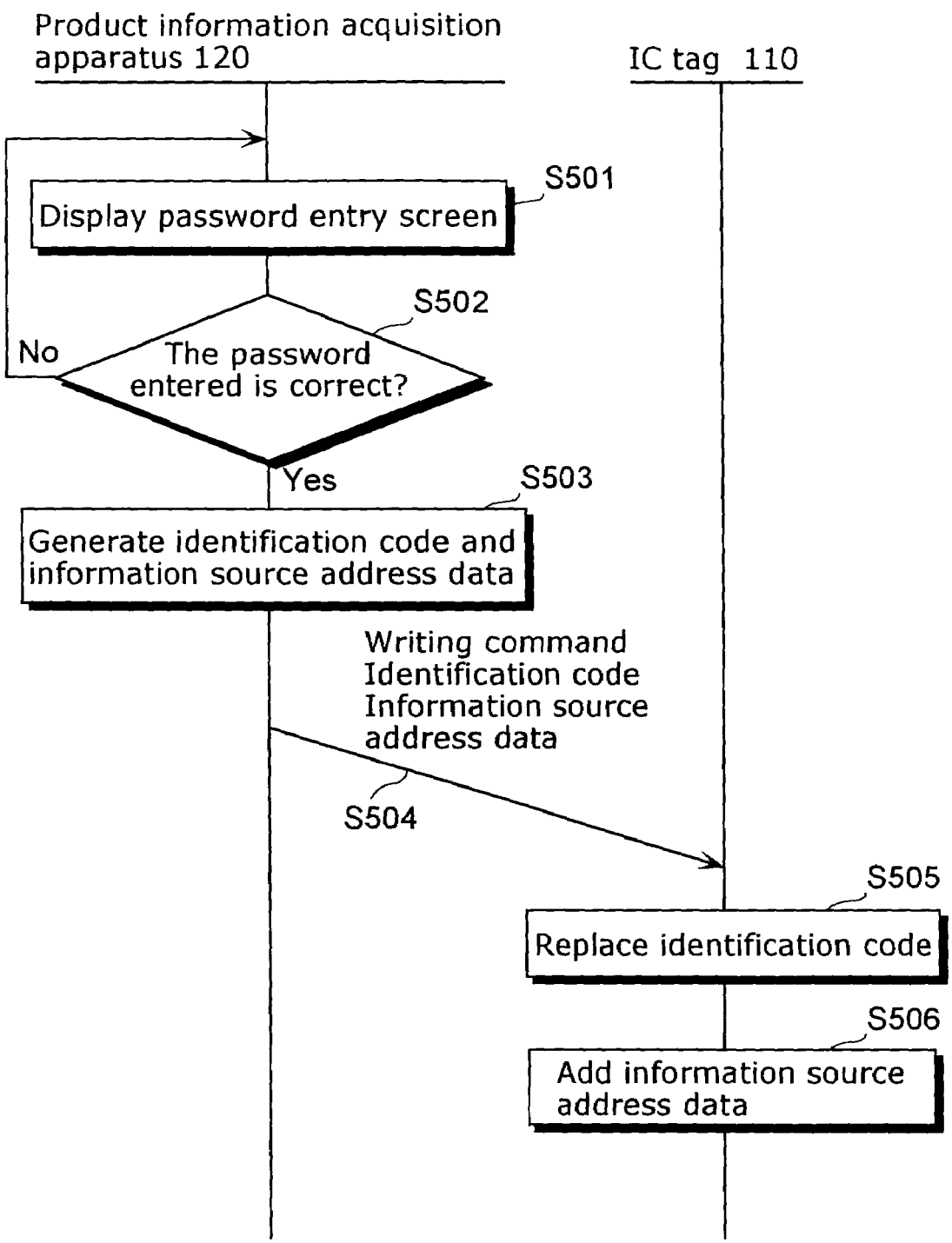
FIG. 6 is a sequence diagram that shows actions taken for writing information in the above system.

The following sequentially describes actions (a flow of data writing processes of the present system) taken by the product information providing system in the embodiment of the present invention with reference to a sequence indicated in FIG. 6.

Processes described in the diagram are also started and ended according to the user's operations. Based upon an operation to start, the acquisition apparatus control unit 123 displays the password entry screen on the display apparatus. The user of the product information acquisition apparatus 120 enters a password by the operation apparatus (Step S501).

When the acquisition apparatus control unit 123 decides the password entered is correct, it takes actions to create new information source address data and identification code 114b. When the acquisition apparatus control unit 123 decides the password entered is not correct, it displays the password entry screen once again on the display apparatus (Step S502).

The acquisition apparatus control unit 123 creates new information source address data and identification code 114b by the product information registration unit 123a (Step S503). For example, suppose there is a case such as follows: 1) Assign a new identification code of "123456789" to the IC tag 110 attached to a television; 2) Also, register new product information indicating "Production"; 3) Store the product information of the "Production" at an address (URL) of "http://www.saba.jp/123456789/production/"; and 4) Need to have the security to the information. In this case, through the product information registration unit 123a, the acquisition apparatus control unit 123 sets "6 (Production)" in a field of "Information ID (a type of the product information)" in the information source address data, sets "http://www.saba.jp/123456789/production/" in a field of "Address (URL)", sets "Yes" in a field of "Security", and consequently generates new information source address data. And then, the acquisition apparatus control unit 123 sets "123456789" in a field of "Identification code" of the identification code 114b, and consequently generates new identification code 114b.

The acquisition apparatus control unit 123 sends the newly generated information source address data, the newly generated identification code 114b and the writing command to the acquisition apparatus sending and receiving unit 122. The acquisition apparatus sending and receiving unit 122 modulates the information source address data, the identification code 114b and the writing command received from the acquisition apparatus control unit 123 into a signal at a specific frequency, and sends it to the acquisition apparatus antenna unit 121. The acquisition apparatus antenna unit 121 keeps sending the radio wave at the specific frequency that includes the information source address data, the identification code 114b and the writing command to the IC tag 110 for a specific period of time (Step S504). The specific period of time mentioned here means sufficient time allocated for the IC tag 110 to replace the already registered identification code 114b with the newly generated identification code 114b and to add the newly generated information source address data to the information source address table 114a.

The tag antenna unit 111 receives the radio wave at the specific frequency that includes the information source address data, the identification code 114b and the writing command, generates AC power, and supplies the AC power to the power supply unit 113. The power supply unit 113 generates DC power from the AC power, and supplies it to the tag control unit 115 and the tag sending and receiving unit 112 and the tag memory unit 114. The tag sending and receiving unit 112 modulates the radio wave at the specific frequency received from the tag antenna unit 111, reproduces the information source address data, the identification code 114b and the writing command, and sends the reproduced information source address data, identification code 114b and writing command to the tag control unit 115. According to the writing command received from the tag sending and receiving unit 112, the tag control unit 115 replaces the identification code 114b received from the tag sending and receiving unit 112 with the identification code 114b memorized in the tag memory unit 114 (Step S505).

The tag control unit 115 adds the information source address data received from the tag sending and receiving unit 112 to the information source address table 114a memorized in the tag memory unit 114 (Step S506).

According to the present embodiment as mentioned above, the information source address table 114a memorized in the IC tag 110 does not contain content of the product information. Therefore, the IC tag 110 does not need to memorize the content of the product information so that a workload of the IC tag 110 can be reduced in the present product information providing system. That is to say, only a link pointer to the information source is stored in the IC tag 110, and a vast amount of information is located in a hard disc or the like in a web site. By doing so, what is realized here is equivalent to a situation when a virtually exhaustless memory apparatus is built in the IC tag 110, and an extremely large amount of information can be memorized.

Also, the information related to the product 100 can be provided to the user through the product information acquisition apparatus 120, which displays the list of the product information contained in the information source address table 114a, selects the product information from the list of the product information according to selection made by the operation apparatus, and displays the selected product information on the display apparatus. Therefore, since the user who views the product information of the product 100 does not need to search for the product information, the present product information providing system does not require the user to do any troublesome operation, and can provide the information related to the product 100.

In addition, the information related to the product 100 can be provided to the user through the product information acquisition apparatus 120, which displays the list of the product information contained in the information source address table 114a, selects the product information from the list of the product information according to selection made by the operation apparatus, acquires only the selected product information from the server A140 or the server B150, and displays the acquired information on the display apparatus. Therefore, because the product information acquisition apparatus 120 does not need to memorize any unnecessary product information, it is possible to reduce a workload of the product information acquisition apparatus 120 in the present product information providing system.

Moreover, an address (URL) of a storage location for the product information is registered in the information source address data. Therefore, it is not necessary for a single server to memorize a plural number of the product information, so that it can reduce a workload of the server in the present product information providing system.

Also, according to the present embodiment, new product information can be registered. Therefore, in the present product information providing system, information obtained at each stage of distribution of the product 100 can be memorized in the IC tag 110 attached to the product 100.

Additionally, the product information is memorized in the server, and the product information is updated when needed. Therefore, when there is some trouble in the product 100, content of the trouble can be informed to the user of the product 100 by updating the product information memorized in the server.

According to the present embodiment, the IC tag 110 attached to the product 100 memorizes the information source address table 114a and the identification code 114b, and sends the information source address table 114a and the identification code 114b to the product information acquisition apparatus 120. However, a code, which includes a two-dimensional code attached to the product 100, may memorize the information source address table 114a and the identification code 114, and may send the information source address table 114a and the identification code 114b to the product information acquisition apparatus 120. Moreover, the information source address table 114a and the identification code 114b may be described in characters on a label attached to the product 100, and their description content may be entered into the product information acquisition apparatus 120 by the operation apparatus.

Furthermore, according to the present embodiment, a type of the product information, an address (URL) of a storage location of the product information, and availability of the security are registered in the information source address data, the product information acquisition apparatus 120 reads out the information registered in the information source address data, and an identification code, a list of the product information and a password entry screen are displayed on the display apparatus based on the readout information. However, a product code for further identifying the type of the product may be registered in the information source address data, and the product information acquisition apparatus 120 may readout the product code registered in the information source address data and display the readout product code on the display apparatus.

Also, according to the present embodiment, when the information source address data and the identification code 114b are newly registered, the information source address data and the identification code 114b are registered at the same time. However, the information source address data and the identification code 114b can be registered separately.

According to the present embodiment, the product information acquisition apparatus 120 generates the information source address table 114a of the IC tag 110 by sending the information source address data to the IC tag 110. However, the product information acquisition apparatus 120 may generate the information source address table 114a, and send the generated information source address table 114a to the IC tag 110.

Also, according to the present embodiment, the information ID is registered in the information source address table 114a. But, by corresponding a location that stores the information source address data to the information ID in the information source address table 114a, the information ID does not have to be registered in the information source address table 114a.

Moreover, according to the present embodiment, one address (URL) is registered for each product information as a storage location of the product information in the information source address data. However, two or more addresses (URLs) of the product information may be registered for each of the product information.

Second Embodiment

In the product information providing system related to the first embodiment mentioned above, the information source address table 114a only contains a minimum data necessary for providing the product information to the user. In this structure, a workload of the IC tag 110 can be reduced. However, when the product information further contains additional product information, the product information acquisition apparatus 120 has to access the server just to select the product information in the product information. Also, when the product information acquisition apparatus 120 displays the product information and the identification code, the product information acquisition apparatus 120 must receive two types of data, i.e. the information source address table 114a and the identification code 114b, which is a problem. Therefore, in a product information providing system according to the second embodiment, the problem above is resolved by having a storage location of the product information contained in the product information and the identification code 114b be registered to the information source address table 114a.

The following describes the product information providing system according to the second embodiment of the present invention with reference to diagrams.

Figure 7:
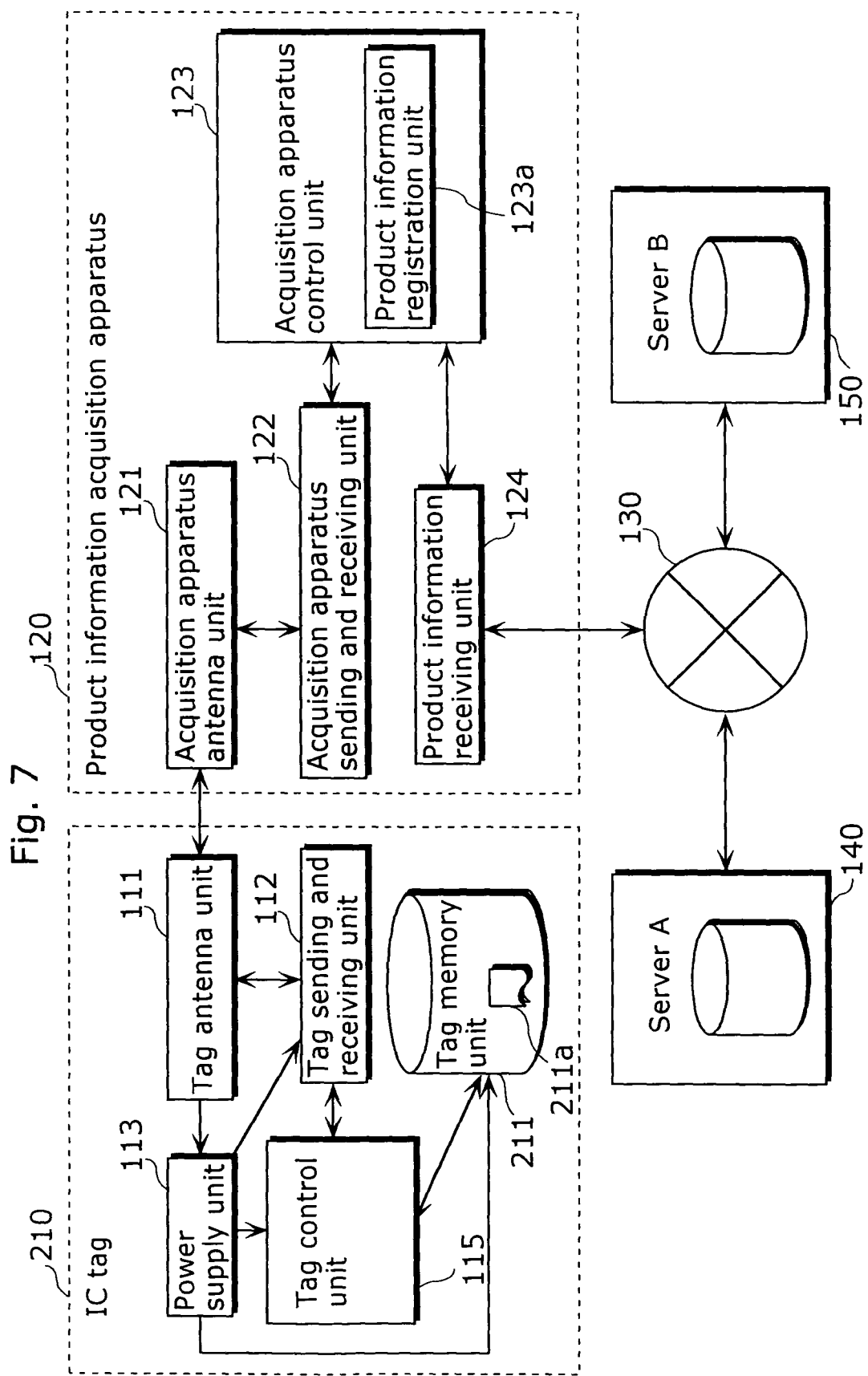
FIG. 7 is a block diagram that shows a configuration of an information providing system according to a second embodiment of the present invention.

FIG. 7 is a system configuration diagram that shows a configuration of the product information providing system according to the present embodiment. This system comprises an IC tag 210 attached to the product 100, the product information acquisition apparatus 120, the server A140 and the server B150 that are connected each other by the network 130. An objective of the product information providing system according to the second embodiment is to provide information related to the product 100 to the user, which is the same as the one of the objectives in the first embodiment. However, in the product information providing system according to the second embodiment, a tag memory unit 211 of the IC tag 210 memorizes the information source address table 211a, which is different from the first embodiment. The following mainly describes points that are different from the first embodiment.

The IC tag 210 memorizes the information source address table 211a, and sends the memorized information source address table 211a to the product information acquisition apparatus 120. The IC tag 210 is functionally composed of the tag antenna unit 111, the tag sending and receiving unit 112, the power supply unit 113, a tag memory unit 211 and the tag control unit 115. The same number is assigned to a structure component of which function is the same as the one in the first embodiment, and its explanation is omitted.

The tag memory unit 211 is composed of a memory and the like, which memorizes the information source address table 211a.

FIG. 8 is a diagram to show content of the information source address table 211a according to the present embodiment.

As shown in FIG. 8, the information source address table 211a is composed of a plurality of the information source address data. In each of the information source address data, the following items are registered: an identification code to identify the product 100 with the IC tag 210 attached; a type of the product information related to the product 100 with the IC tag 210 attached; the product information contained in the product information; an address (URL) of a storage location for the product information contained in the product information; and availability of the security of the product information contained in the product information. For example, the information source address table 211a is composed of information source address data related to the product information called "Basic information" contained in the product information called "Production" of the product 100 with the assigned identification code of "987654321", the information source address data related to the product information called "Material" contained in the product information called "Production" of the product 100 with the attached identification code of "987654321" and the like. In the information source address data related to the product information called "Basic information" contained in the product information called "Production" of the product 100 with the attached identification code of "987654321", an address (URL) of "http://www.saba.jp/987654321/production/" indicating a storage location for the product information called the "Basic information" and the availability of security for the product information of the "Basic information" are registered.

Also, in the product information of the information source address data, an information ID for identifying a type of the product information is assigned. For example, the information ID, "6" is assigned to the product information called "Production", the information ID, "6A" is assigned to the product information contained in the product information called "Production", the information ID, "8" is assigned to the product information called "Sales", and the information ID "8B" is assigned to the product information called "Warranty" contained in the production information called "Sales".

Figure 9:
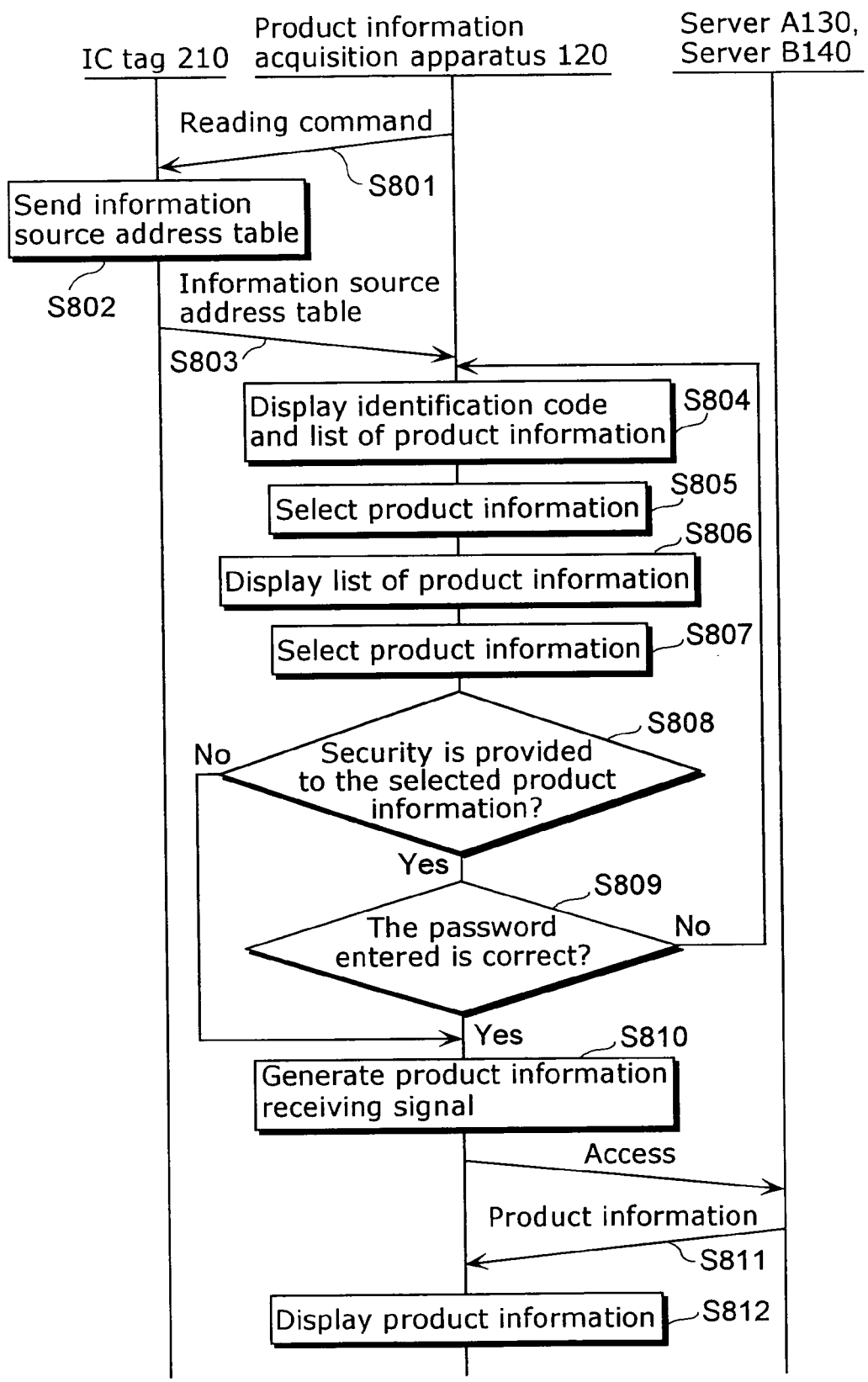
FIG. 9 is a sequence diagram that shows actions taken for reading information in the above system.

Along with a sequence shown in FIG. 9, the following sequentially describes actions (a flow of data reading processes in the present system) taken by the product information providing system according to the embodiment of the present invention structured as above.

The processes in the diagram are started and ended according to the user's operations. Based upon receiving the operation to start, the product information acquisition apparatus 120 keeps sending a radio wave at a specific frequency including the reading command to the IC tag 210 attached to the product 100 for a specific period of time (Step S801). The specific period of time mentioned here is time sufficiently allocated for the product information acquisition apparatus 120 to receive the information source address table 211a from the IC tag 210.

The tag antenna unit 111 of the IC tag 210 attached to the product 100 receives the radio wave at the specific frequency including the reading command, generates AC power, and supplies the AC power to the power supply unit 113. The power supply unit 113 generates DC power from the AC power, and supplies it to the tag control unit 115 and the tag sending and receiving unit 112 and the tag memory unit 211.

The tag sending and receiving unit 112 demodulates the radio wave at the specific frequency received by the tag antenna unit 111, reproduces the reading command, and sends the reproduced reading command to the tag control unit 115. The tag control unit 115 receives the information source address table 211a from the tag memory unit 211 based on the reading command, and sends it to the tag sending and receiving unit 112 (Step S802).

The tag sending and receiving unit 112 modulates the received information source address table 211a into a signal at a specific frequency and sends it to the tag antenna unit 111. The tag antenna unit 111 sends the information source address table 211a as a radio wave at a specific frequency to the product information acquisition apparatus 120 (Step S803).

The acquisition apparatus antenna unit 121 receives the radio wave at the specific frequency that includes the information source address table 211a. The acquisition apparatus sending and receiving unit 122 demodulates the radio wave at the specific frequency received by the acquisition apparatus antenna unit 121, reproduces the information source address table 211a, and sends the reproduced the information source address table 211a to the acquisition apparatus control unit 123. Based on the information source address table 211a, the acquisition apparatus control unit 123 displays a list of the product information and the identification code of the product 100 with the IC tag 210 attached on the display apparatus (Step S804). For example, when the product information acquisition apparatus 120 sends the radio wave at the specific frequency that includes the reading command to the IC tag 210 attached to a video, the acquisition apparatus control unit 123 receives the information source address table 211a related to the video with the IC tag 210 attached, and displays, based on the received information source address table 211a, the identification code of "987654321" and a list of the product information of "Production", "Sales", "Service" and "Recycling" on the display apparatus.

The acquisition apparatus control unit 123 selects product information from the list of the product information according to selection made by the user's operation apparatus of the product information acquisition apparatus 120 (Step S805).

Based on the information source address table 211a, the acquisition apparatus control unit 123 displays the list of the product information contained in the selected product information on the display apparatus (Step S806). For example, when the content of "Production", "Sales", "Service" and "Recycling" is displayed on the display apparatus as the list of the product information, and the product information "Production" is selected, the acquisition apparatus control unit 123 displays the list of the product information contained in the product information having content called "Basic information", "Material", "How to produce", "Quality", and "Repair" on the display apparatus (See FIG. 8).

The acquisition apparatus control unit 123 selects the product information from the list of the product information contained in the product information according to selection made by the user's operation apparatus of the product information acquisition apparatus 120 (Step S807).

The acquisition apparatus control unit 123 decides whether the security is provided to the selected product information or not (Step S808). For example, when the contents of "Basic information", "Material", "How to produce", "Quality" and "Repair" are displayed on the display apparatus as the list of the product information, and the product information of "Basic information" is selected, the acquisition apparatus control unit 123 decides the security is provided. When the product information of "Material" is selected, the acquisition apparatus control unit 123 decides the security is not provided (See FIG. 8).

When the acquisition apparatus control unit 123 decides the security is provided to the selected product information, the password entry screen is displayed on the display apparatus.

When the acquisition apparatus control unit 123 decides the password entered by the operation apparatus is correct, it takes actions to receive the product information. When the acquisition apparatus control unit 123 decides the password entered by the operation apparatus is not correct, it displays the list of the product information once again on the display apparatus (Step S809).

When the security is not provided to the selected product information, or when the password entered by the operation apparatus is decided to be correct, the acquisition apparatus control unit 123 generates a product information receiving signal that instruct to receive the selected product information (Step S810). For example, when the contents of "Basic information", "Material", "How to produce", "Quality" and "Repair" are displayed on the display apparatus as the list of the product information, and the product information of "Quality" is selected by the operation apparatus, the acquisition apparatus control unit 123 generates the product information receiving signal for the content of "http://www/saba.jp/987654321/production/quality/" (See FIG. 8).

The acquisition apparatus control unit 123 sends the generated product information receiving signal to the product information receiving unit 124. The product information receiving unit 124 accesses the server A140 or the server B150 based on the product information receiving signal, and receives the product information from the accessed server A140 or server B150 (Step S811).

The product information receiving unit 124 sends the received product information to the acquisition apparatus control unit 123. The acquisition apparatus control unit 123 displays the content of the received product information on the display apparatus (Step S812).

The content displayed on the display apparatus is shown in FIG. 10.

Figure 10A:
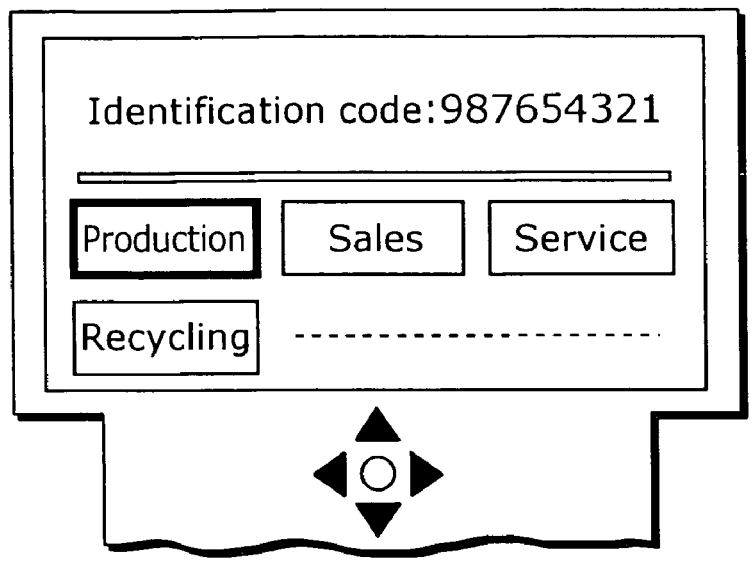
FIG. 10A is a diagram that shows content displayed when a product information acquisition apparatus 120 receives the information source address table 211a from an IC tag 210 in the above system.

FIG. 10A shows the content displayed on the display apparatus when the product information acquisition apparatus 120 receives the information source address table 211a from the IC tag 210 attached to the video. The content displayed is composed of the identification code and the list of the product information. In this case, the content, "The identification code of this video is "987654321", and the product information of "Production", "Sales", "Service" and "Recycling" related to this video is registered," is displayed on the display apparatus (See FIG. 8).

Figure 10B:
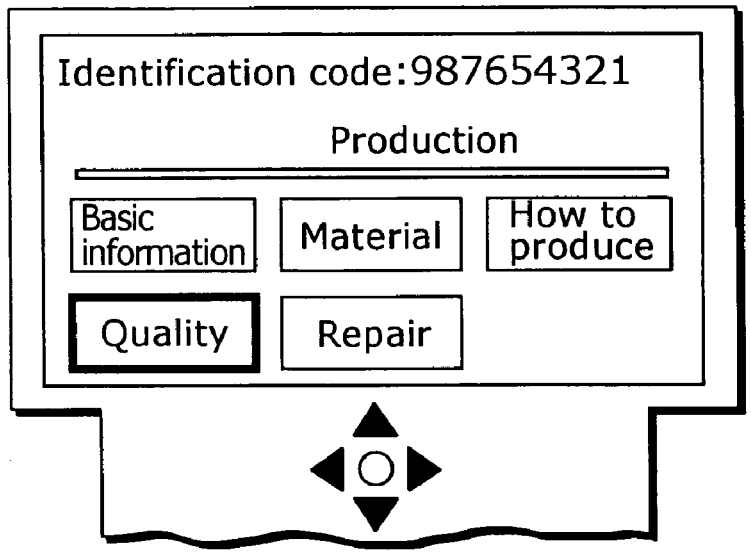
FIG. 10B is a diagram that shows content displayed when particular product information is selected from a list of production information in the above system.

FIG. 10B shows the content displayed on the display apparatus when the user of the product information acquisition apparatus 120 selects the production information of "Production" through the operation apparatus in FIG. 10A. The content displayed is composed of the identification code, the selected product information, the list of the product information contained in the selected product information. In this case, the content, "The identification code of this video is "987654321", the product information of "Production" is selected by the user for this video, and the product information of "Basic information", "Material", "How to produce", "Quality" and "Repair" is contained in the product information called "Production"" is displayed on the display apparatus (See FIG. 8).

Figure 10C:
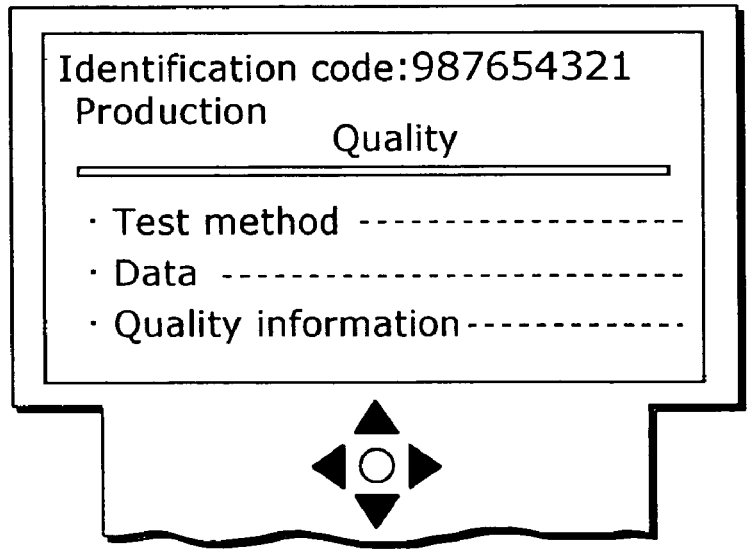
FIG. 10C is a diagram that shows content displayed when particular product information is selected from a list of product information contained in the product information selected in the above system.

FIG. 10C shows the content displayed on the display apparatus when the user of the product information acquisition apparatus 120 selects the product information of "Quality" through the operation apparatus in FIG. 10B. The content displayed is composed of the identification code, the selected product information, the product information selected from the list of the product information contained in the selected product information, and the content of the product information. In this case, the content, "The identification code of this video is "987654321", the product information called "Production" related to this video is selected by the user, and moreover the product information of "Quality" is selected from the product information contained in the product information called "Production", and the product information of "Quality" contains content of "Test method, Data and Quality information"" is displayed on the display apparatus.

Next, the following sequentially describes actions (a flow of data writing processes in the present system) taken by the product information providing system according to the embodiment of the present invention with reference to a sequence indicated in FIG. 11.

The processes in the diagram are also started and ended according to the user's operation. Based upon the operation to start, the acquisition apparatus control unit 123 displays the password entry screen on the display apparatus. The user of the product information acquisition apparatus 120 enters a password by the operation apparatus (Step S1001).

When the acquisition apparatus control unit 123 decides the password entered is correct, it takes actions to generated new information source address data. When the acquisition apparatus control unit 123 decides the password entered is not correct, it displays the password entry screen once again on the display apparatus (Step S1002).

The acquisition apparatus control unit 123 generates new information source address data by the product information registration unit 123a (Step S1003). For example, there is a situation such as follows: 1) Assign a new identification code of "987654321" to the IC tag 210 attached to a video; 2) Register the new product information called "Repair" contained in the product information of "Production"; 3) Store the product information of the "Production" at an address (URL) of "http://www.saba.jp/987654321/production/repair/"; and 4) Need to have the security to the information. In this case, the acquisition apparatus control unit 123 sets "987654321" in a field of the "identification code" of the information source address data, sets "6 (sales)" in a field of the "information ID (first layer)", sets "6E (repair)" in a field of the "information ID (second layer), sets "http://www.saba.jp/987654321/production/repair/" in a field of the "address (URL)", sets "Yes" in a field of the "security", and generates new information source address data.

The acquisition apparatus control unit 123 sends the newly generated information source address data and writing command to the acquisition apparatus sending and receiving unit 122. The acquisition apparatus sending and receiving unit 122 modulates the information source address data and the writing command received from the acquisition apparatus control unit 123 into a signal at a specific frequency, and sends it to the acquisition apparatus antenna unit 121. The acquisition apparatus antenna unit 121 keeps sending the radio wave at the specific frequency that includes the information source address data and the writing command to the IC tag 210 for a specific period of time (Step S1004). The specific period of time mentioned here means to be time sufficiently allocated for the IC tag 210 to newly add the information source address data to the information source address table 211a.

The tag antenna unit 111 receives the radio wave at the specific frequency that includes the information source address data and the writing command, generates AC power, and supplies the AC power to the power supply unit 113. The power supply unit 113 generates DC power from the AC power, and supplies it to the tag control unit 115 and the tag sending and receiving unit 112. The tag sending and receiving unit 112 and the tag memory unit 211 demodulate the radio wave at the specific frequency received by the tag antenna unit 111, reproduces the information source address data and the writing command, and sends the reproduced information source address data and writing command to the tag control unit 115. According to the writing command received from the tag sending and receiving unit 112, the tag control unit 115 adds the information source address data received from the tag sending and receiving unit 112 to the information source address table 211a memorized in the tag memory unit 211 (Step S1005).

According to the embodiment mentioned as above, an address (URL) of a storage location for the product information contained in the product information is registered in the information source address table 211a. Because of this, it is not necessary for the product information acquisition apparatus 120 to access the server just for acquiring a list of the product information contained in the product information. Therefore, a workload of the product information acquisition apparatus 120 can be reduced in the present product information providing system.

Additionally, the identification code is registered in the information source address table 211a. Because of this, when the product information acquisition apparatus 120 displays the product information and the identification code, it is not necessary for the product information acquisition apparatus 120 to receive the information source address table 114a and the identification code 114b individually. Therefore, a workload of the product information acquisition apparatus 120 can be reduced in the present product information providing system.

According to the present embodiment, the address (URL) of the storage location for the product information is registered in the information source address table 211a memorized in the IC tag 210. However, in stead of registering the address (URL) of the storage location for the product information in the information source address table 211a, the product information acquisition apparatus 120 memorizes a corresponding table for the information ID of the product information and the address (URL) of the storage location for the product information. By doing so, the product information acquisition apparatus 120 may receive the information ID from the IC tag 210, and displays the product information based on the information ID and the corresponding table.

Furthermore, in the present embodiment, the product information contained in the product information is registered in the information source address table 211a, and the product information is 2 layered structure data. However, the product information may further be multitiered structure data, and the multitiered structure data may be registered in the information source address table 211a.

Also, a label in which codes including a barcode and a two dimensional code are printed may be used in stead of the IC tag 110 and the IC tag 210. In this case, in stead of having the acquisition apparatus antenna unit 121 that composes the product information acquisition apparatus 120 shown in FIG. 2 and FIG. 7, the same effects are performed by having an image reading unit composed of an image sensor and the like that reads out the barcode or the two dimensional code, and an decoding processing unit that digitalizes this output signal and decodes it.

Moreover, for wireless communications with the IC tag, various types of frequencies such as 125 KHZ, 13.56 MHZ, 800 to 900 MHZ, 2.45 GHZ are available, but the wireless communications with the IC tag are not limited to these.

In addition to this, a nonvolatile memory such as EEPROM, FERAM and MRAM is generally used as a memory that composes the tag memory unit 114 or the tag memory unit 211.

As has been clarified from above explanation, according to the label related to the present invention, the label attached to the product memorizes a storage location of the information related to the product, and does not need to memorize the information related to the product as it is. Therefore, there are effects that the information related to the product may be efficiently memorized in the label, and the latest updated information is available to be accessed. In addition to it, because the label is equipped with a noncontact IC tag, it means the label can have a large amount of data capacity, and therefore it can memorize a large amount of information. Furthermore, according to the product information acquisition apparatus related to the present invention, the product information acquisition apparatus provides the user means to view information related to a product that is memorized in the label related to the present invention, and does not require the user to do any troublesome operations for viewing the content of the information related to the product. Then, according to the product code editing apparatus related to the present invention, the product code editing apparatus provides the user means to register new information related to the product to the label related to the present invention, so that the user can register the information related to the product, which is obtained at each stage of product's distribution and usage.

Therefore, in processes of production, sales, usage/service and recycling, it is possible through the present invention to provide the label that can memorize information efficiently, and provide the product information acquisition apparatus that does not require the user to perform any troublesome operations for viewing the content of the information, of which practical value is extremely high in today's society where an excessive amount of information necessary for our daily lives overflows.

What is claimed is:

1. A product information acquisition apparatus that acquires product information related to a product with a label attached, said apparatus comprising:

a reading unit operable to read out, from the label, plural types of product information and plural information source addresses each of which corresponds to the corresponding type of product information and specifies a storage location where the product information of the corresponding type is stored;

a display unit operable to display the plural types of the product information read out by said reading unit;

an operation unit operable to receive, from one or more users, a selection of the type of product information, from among the plural types of product information displayed by said display unit; and an information acquisition unit operable to acquire the product information from the information source address corresponding to the type of product information selected by said operation unit, wherein said reading unit is operable to read out plural pieces of security information each of which corresponds to the corresponding type of product information and indicates whether or not access to the storage location where the product information of the corresponding type is stored is to be restricted, and said product information acquisition apparatus further comprising:

a decision unit operable to decide whether or not the security information for restricting access corresponds to the type of product information selected by said operation unit, and to require the user to enter a password when the decision is made that the security information for restricting access corresponds to the type of product information, wherein said information acquisition unit is operable to acquire product information of the type that is selected by said operation unit and corresponds to the security information for restricting access when the password entered in response to the requirement of said decision unit is correct, and not to acquire the product information of the type that is selected by said operation unit and corresponds to the security information for restricting access when the password entered in response to the requirement of said decision unit is not correct.

2. The product information acquisition apparatus according to claim 1, wherein the information source address is a URL that specifies a web site on the Internet.

3. The product information acquisition apparatus according to claim 1, wherein the label comprises a noncontact IC tag.

4. The product information acquisition apparatus according to claim 3, wherein the information source address is a URL that specifies a web site on the Internet.

5. The product information acquisition apparatus according to claim 1, wherein the label comprises a two-dimensional code.

6. The product information acquisition apparatus according to claim 5, wherein the information source address is a URL that specifies a web site on the Internet.

7. A product information acquisition apparatus that acquires product information related to a product with a label attached, said apparatus comprising:
- a storage unit which includes a table indicating plural types of product information and an information source address which corresponds to the type of product information and specifies a storage location where the product information of the corresponding type is stored;
- a reading unit operable to read out the plural types of product information from the label;
- a display unit operable to display the plural types of product information read out by said reading unit;
- an operation unit operable to receive, from one or more users, a selection of the type of product information, from among the plural types of product information displayed by said display unit; and
- an information acquisition unit operable to acquire the product information from the information source address corresponding to the type of product information selected by said operation unit, wherein said reading unit is operable to read out plural pieces of security information each of which corresponds to the corresponding type of product information and indicates whether or not access to the storage location where the product information of the corresponding type is stored is to be restricted, and said product information acquisition apparatus further comprising:

a decision unit operable to decide whether or not the security information for restricting access corresponds to the type of the product information selected by said operation unit, and to require the user to enter a password when the decision is made that the security information for restricting access corresponds to the type of product information, wherein said information acquisition unit is operable to acquire the product information of the type that is selected by said operation unit and corresponds to the security information for restricting access when the password entered in response to the requirement of said decision unit is correct, and not to acquire the product information of the type that is selected by said operation unit and corresponds to the security information for restricting access when the password entered in response to the requirement of said decision unit is not correct.

8. The product information acquisition apparatus according to claim 7, wherein the information source address is a URL that specifies a web site on the Internet.

9. The product information acquisition apparatus according to claim 7, wherein the label comprises a noncontact IC tag.

10. The product information acquisition apparatus according to claim 9, wherein the information source address is a URL that specifies a web site on the Internet.

11. The product information acquisition apparatus according to claim 7, wherein the label comprises a two-dimensional code.

12. The product information acquisition apparatus according to claim 11, wherein the information source address is a URL that specifies a web site on the Internet.

* * * * *